US005213142A

United States Patent [19]

Koch et al.

[11] Patent Number: 5,213,142

[45] Date of Patent: May 25, 1993

[54] STAGE II VAPOR RECOVERY SYSTEM

[75] Inventors: Wolfgang H. Koch, Batavia; Dennis J. Strock, Woodridge; Michael S. Butkovich, Aurora; Harry B. Hartman, Sugar Grove, all of Ill.

[73] Assignee: Amoco Corporation, Chicago, Ill.

[21] Appl. No.: 664,326

[22] Filed: Mar. 4, 1991

[51] Int. Cl.[5] .......... B60S 5/02

[52] U.S. Cl. .......... 141/59; 141/45; 141/98; 141/206; 141/210; 141/301; 137/234.6

[58] Field of Search .......... 141/44-46, 141/59, 206-210, 217, 218, 225-228, 94, 301, 302, 102, 103, 104, 99, 1, 4, 5, 7, 8, 98, 392, 83; 137/234.6; 222/14-16, 2

[56] References Cited

U.S. PATENT DOCUMENTS

| | | | |
|---|---|---|---|
| 2,874,735 | 2/1959 | Boone | 141/208 |
| 3,548,893 | 12/1970 | Moore | 141/208 |
| 3,587,337 | 6/1971 | Young | 222/26 X |
| 3,799,397 | 3/1974 | Mariner | 141/225 |
| 3,847,302 | 11/1974 | Krone et al. | 222/14 |
| 3,863,687 | 2/1975 | Alquist | 141/45 |
| 3,926,230 | 12/1975 | Stary et al. | 141/45 |
| 4,068,687 | 1/1978 | Long | 141/59 |
| 4,351,375 | 9/1982 | Polson | 141/302 |
| 4,418,730 | 12/1983 | McMath | 141/208 |
| 4,429,725 | 2/1984 | Walker et al. | 141/59 |
| 4,497,350 | 2/1985 | Guertin | 141/206 |
| 4,566,504 | 1/1986 | Furrow et al. | 141/45 |
| 4,570,686 | 2/1986 | Devine | 141/59 |
| 4,572,255 | 2/1986 | Rubinovich | 222/14 |
| 4,627,553 | 12/1986 | Yoshida et al. | 222/14 |
| 4,658,987 | 4/1987 | Fink, Jr. | 222/52 |
| 4,687,033 | 8/1987 | Furrow et al. | 141/44 |
| 4,809,753 | 3/1989 | Fink, Jr. | 141/206 |
| 4,881,581 | 11/1989 | Hollerback | 141/113 |
| 4,901,748 | 2/1990 | Shotmeyer | 137/234.6 |
| 4,986,446 | 1/1991 | Montgomery | 137/234.6 |
| 5,035,271 | 7/1991 | Carmack et al. | 141/206 |

FOREIGN PATENT DOCUMENTS

| | | | |
|---|---|---|---|
| 284768 | 12/1952 | Switzerland | 141/225 |

*Primary Examiner*—Henry J. Recla
*Assistant Examiner*—Casey Jacyna
*Attorney, Agent, or Firm*—Thomas T. Tolpin; James R. Henes; Frank J. Sroka

[57] ABSTRACT

A Stage II Vapor Recovery System is provided with a special array of storage tanks, dispensers, fuel pumps, vapor assist pumps, and flow control nozzles, to capture hydrocarbon emissions, prevent condensate from blocking vapor return lines, and dispense gasoline or other liquid fuel and condensate to customer tanks. Specifically, fuel lines connect storage tank to flow control nozzles via dispensers and are assisted by fuel pumps to pump gasoline into customers' tanks. The nozzles have vapor passageways to capture hydrocarbon vapors emitted during fueling. The captured vapors are pumped by vapor assist pumps from the vapor passageways through vapor return lines into the storage tanks. The nozzles are equipped with condensate liquid pickup tubes to remove condensed vapors blocking the vapor return lines. The condensate liquid tubes communicate with condensate venturi ports adjacent venturi sleeves in the nozzles. Liquid sensing tubes in the vapor return passageways activate automatic shutoff valves in the nozzles to shut off the flow of gasoline when the customer's tank is filled.

7 Claims, 8 Drawing Sheets 20
24
25
26
27
28
29
30
31
32
33
34
35
36
37
38
39
40
41
42
43
44
45
50
51
52
53
54
55
56
58
59
60
61
62
64
65
67
72
74
112

Po−Pt=SUCTION=LIFT PRESSURE

STAGE II VAPOR RECOVERY SYSTEM

BACKGROUND OF THE INVENTION

This invention relates to service station equipment and, more particularly, to a Stage II Vapor Recovery System.

When filling vehicle tanks with gasoline or other volatilizable fuel through dispensing nozzles of conventional (non-vapor recovery) systems, vapors from the gasoline or other volatilizable fuel within the vehicle tank escape to the atmosphere through the opening in which the spout of the nozzle is inserted and may pollute the air. Large numbers of vehicles being fueled at service stations over a period of time can result in a substantial emission and accumulation of hydrocarbons into the atmosphere. On average, there are about four grams of hydrocarbons in a gallon of vapor mixture displaced during fueling. In terms of hydrocarbon air contaminants, these four grams of hydrocarbons, are about 20% of the emissions of newer vehicles. Stage II vapor recovery is a strategy to capture the vapors released during fueling of vehicles so as to minimize atmospheric hydrocarbon vapor emissions which when exposed to sunlight can react with other air contaminants to create ozone.

Historically, stage II vapor recovery is a result of substantial well-founded concerns of the public and various government agencies, such as the U.S. Environmental Protection Agency (EPA), over the quality of air in many population centers. In response to these concerns, the EPA and other government agencies have established a set of air quality standards.

In order to attain these air quality standards, stage II vapor recovery systems have been recommended or mandated by many regulatory bodies of federal, state, county, municipal and local governments, such as environmental agencies, air resource boards, and health departments. In stage II vapor recovery systems, fuel is dispensed into vehicle tanks at service stations and, simultaneously, a substantial amount of the refueling hydrocarbon vapor emissions are returned to the storage tanks in the service stations. Vapor recovery systems can be classified in two categories: balanced pressure systems and vacuum assist systems.

In balanced pressure systems, an elastomeric boot or other positive sealing arrangement is provided to engage and seal the fill opening or filler pipe of the vehicle tank during fueling. The interior of the boot is connected through a vapor return conduit to the underground storage tank so that hydrocarbon vapors emitted during fueling naturally flow to the storage tank to maintain the pressure balance between the vehicle tank and the storage tank.

The vacuum assist system differs from the balanced pressure system because it does not require a tight sealing boot or some other positive sealing arrangement with the fill opening or filler pipe of the vehicle tank. Instead, the vapor return conduits are connected through a vapor pump, vacuum pump or other vacuum inducing assist device to collect and transport the vapors emitted during fueling to the storage tanks.

In stage II vapor recovery systems, a natural phenomena that occurs is that as warm gasoline vapors from the vehicle tank return through the vapor return hose of the island dispenser, a certain portion of the vapors condense into liquid because of changes in temperature and pressure. These condensed liquids collect in the low point of the vapor return hose and, if not removed, can accumulate and block the vapor passageway. Such blockage can render the stage II vapor recovery system ineffective by precluding the return of vehicle tank vapors to the storage tanks. Furthermore, such collected condensate, if not properly controlled and removed, may spill onto to the clothing and shoes of customers, creating an undesirable odor as well as a potentially flammable and dangerous condition.

Various suggestions have been proposed to overcome this condensate problem. These suggestions have generally not been satisfactory from a technical and economic viewpoint and have not been met with consumer enthusiasm. One suggestion has been to decrease the size of the vapor return hoses. Such a suggestion is generally not practicable for most service stations. Dispensing equipment manufacturers, such as Gilbarco and Dayco, have suggested add-on devices to the dispenser fuel hose which create a low pressure area in the vapor return hoses. These add-on devices, however, are expensive, bulky, and subject to leakage, as well as undesirably reducing the delivery flow rate of fuel to the vehicle tank by as much as 20%. Furthermore, customers don't like the add-on systems because it takes longer to fill their vehicle tanks. Moreover, service station managers and proprietors generally do not like these add-on devices because they are inefficient and preclude servicing as many customers per hour as systems not using these devices.

Over the years a variety of nozzles and other items of service station equipment have been developed or suggested. These prior art nozzles and prior art items of service station equipment have been met with varying degrees of success, but have generally not solved the preceding problems. Typifying these prior art nozzles and prior art service station equipment items are those found in U.S. Pat. Nos. 2,527,760; 2,908,299; 3,845,792; 3,016,928; 3,756,291; 3,763,901; 3,805,857; 3,826,291; 3,830,267; 3,835,899; 3,840,055; 3,845,792; 3,850,208; 3,874,427; 3,913,633; 3,914,095; 3,915,206; 3,918,932; 3,941,168; 3,952,781; 3,981,335; 3,989,072; 3,990,490; 4,441,533; 4,057,086; 4,058,147; 4,068,687; 4,082,122; 4,090,525; 4,095,626; 4,095,626; 4,098,308; 4,098,308; 4,111,244; 4,131,140; 4;133,355; 4,143,689; 4,153,073; 4,157,104; 4,166,485; 4,167,957; 4,197,883; 4,199,012; 4,202,385; 4,203,478; 4,204,563; 4,213,488; 4,223,706; 4,244,403; 4,245,681; 4,253,503; 4,256,151; 4,258,760; 4,295,504; 4,295,802; 4,306,594; 4,310,033; 4,320,788; 4,336,830; 4,343,337; 4,351,375; 4,372,353; 4,429,725; 4,441,533; 4,469,149; 4,497,350; 4,502,516; 4,557,302; 4,566,504; 4,570,686; 4,593,729; 4,687,033; 4,825,914; 4,827,987; 4,984,612; and RE. 31,882; and in Swiss Patent Number 385,053; and U.K. Patent Publication 2,016,417A.

It is, therefore, desirable to provide an improved stage II vapor recovery system which overcomes most, if not all, of the preceding problems.

SUMMARY OF THE INVENTION

An improved Stage II Vapor Recovery System is provided which captures hydrocarbon vapors emitted from customers' tanks during fueling and returns condensed vapors to the customers' tanks. Advantageously, the system is user friendly and can dispense different grades of gasoline. Furthermore, the improved system provides excellent fuel throughput and control of hydrocarbon emissions.

To this end, the Stage II Vapor Recovery System has one or more of the following equipment: (a) an underground or aboveground vented storage tank, which contains liquid volatilizable hydrocarbon fuel, such as gasoline, and hydrocarbon vapors; (b) a dispenser to meter the fuel from the storage tanks; (c) a fuel pump comprising a submerged pump in the storage tank or a suction pump in the dispenser, to pump fuel to the dispenser from the storage tank; (d) a vapor pump to withdraw volatilized hydrocarbon vapors under suction pressure; (e) a multi-purpose nozzle to control dispensing of fuel into a fill opening of a customer's tank such as a vehicle tank, to recover volatilized hydrocarbon vapors emitted from the customer's or consumer's tank during fueling, and to recover condensate (condensed vapors); (f) a fuel line assembly including a fuel line which connects the storage tank and the dispenser, and a fuel hose which connects the dispenser and the nozzle; and (g) a vapor return line assembly including a vapor return hose which connects the nozzle and the vapor pump to receive vapors from the nozzle and which collects condensed vapors (condensate), and includes a vapor return line which connects and passes vapors from the dispenser to the storage tank. The vapor pump can comprise a twin rotor vane pump with rotors connected along a common shaft. One of the rotors can comprise a fuel motor or gasoline turbine. A manifold system can be provided to connect the vapor return line assembly to multiple storage tanks.

The multi-purpose nozzle has a spout assembly to discharge the fuel into the customer's tank and includes vapor collection components to collect a substantial amount of volatilized hydrocarbon vapors emitted from the customer's tank during fueling. The vapor collection components can include an outer vapor return spout with portions positioned coaxially about an inner fuel spout and vapor passages (passageways) to pass the vapors to the vapor return hose.

The multi-purpose nozzle also features a condensate withdrawal assembly to remove condensate in the vapor return hose so as to minimize blockage of vapors being drawn through the vapor return hose. The components of the condensate withdrawal assembly can include a slurpy or liquid pickup tube which can extend into the vapor return hose, and orifices or a venturi sleeve with multiple ports communicating with the vapor return hose.

In the preferred form, the nozzle has an automatic shutoff assembly with a liquid sensing tube which is disposed along the spout assembly and extends to a position adjacent the vapor inlet. The liquid sensing tube and automatic shutoff assembly cooperate with each other to sense and automatically stop the dispensing of fuel when fuel enters the vapor inlet of the nozzle.

The preferred nozzle also has the following features: (1) an attitude shutoff assembly to stop the discharge of fuel when the spout is positioned and orientated in an upward attitude; (2) a prepay valve assembly to assure nozzle shutoff by closing the flow control valve when flow of fuel is terminated after a selected monetary amount or quantity of fuel has been metered; (3) a vapor valve assembly to allow vapor withdrawal only during discharging of fuel, i.e. by preventing vapor withdrawal except during fueling; and (4) a nozzle flow check valve assembly to prevent unauthorized draining of the fuel hose and unauthorized discharging of the fuel through the fuel spout.

A more detailed explanation of the invention is provided in the following description and appended claims taken in conjunction with the accompanying drawings.

DETAILED DESCRIPTION OF THE PREFERRED EMBODIMENTS

Figure 1:
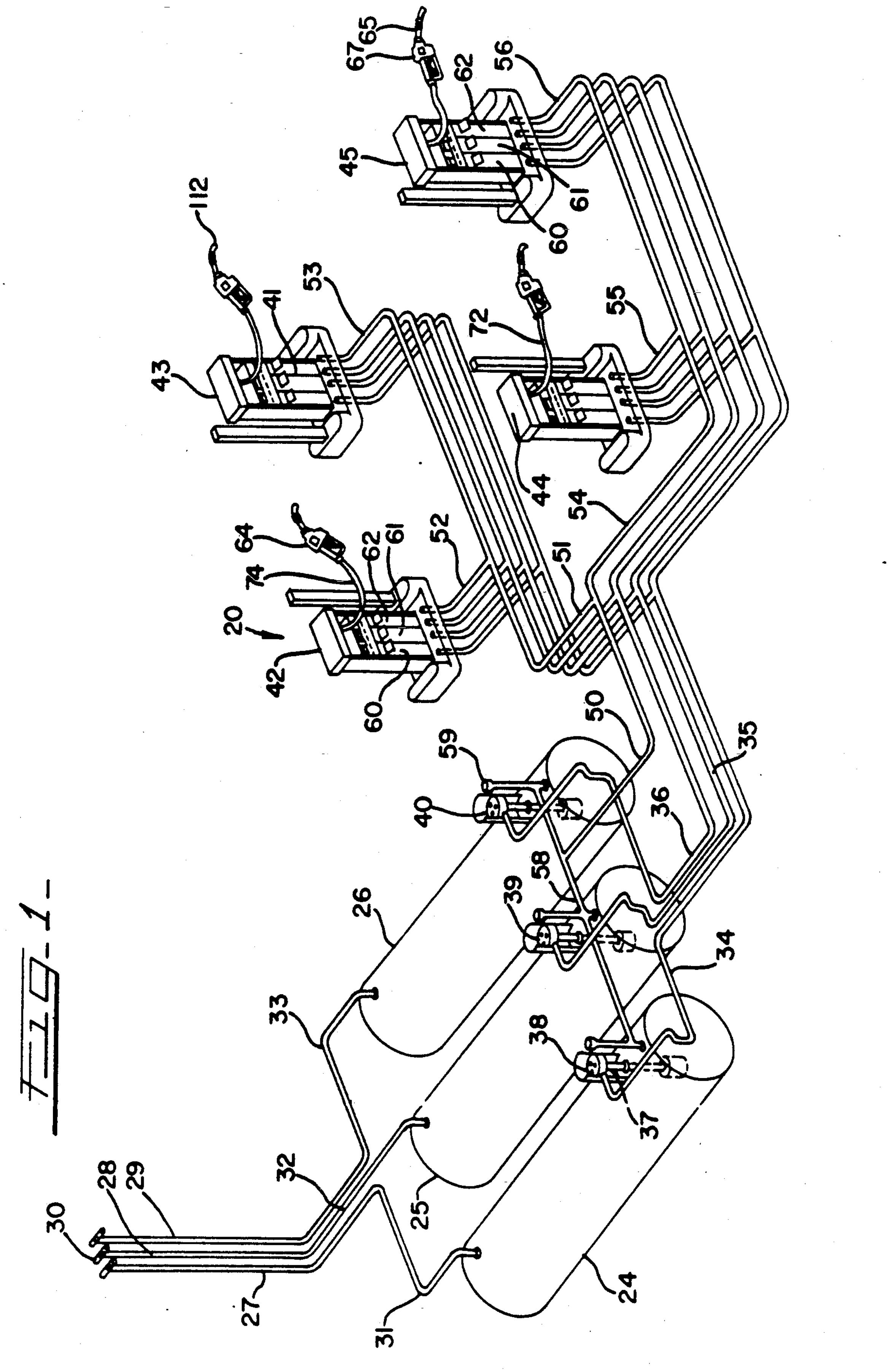
FIG. 1 is a perspective view of a Stage II Vapor Recovery System with a manifold.

As shown in FIG. 1, a Stage II Vapor Recovery System 20 has a set, series, and array of elongated underground storage tanks 24–26. Each underground storage tank contains gasoline vapors and a different grade of gasoline with a different octane number. In the preferred embodiment, there are three underground storage tanks 24–26 for three different grades of gasoline, such as regular, premium, and intermediate grade gasoline.

Figure 2:
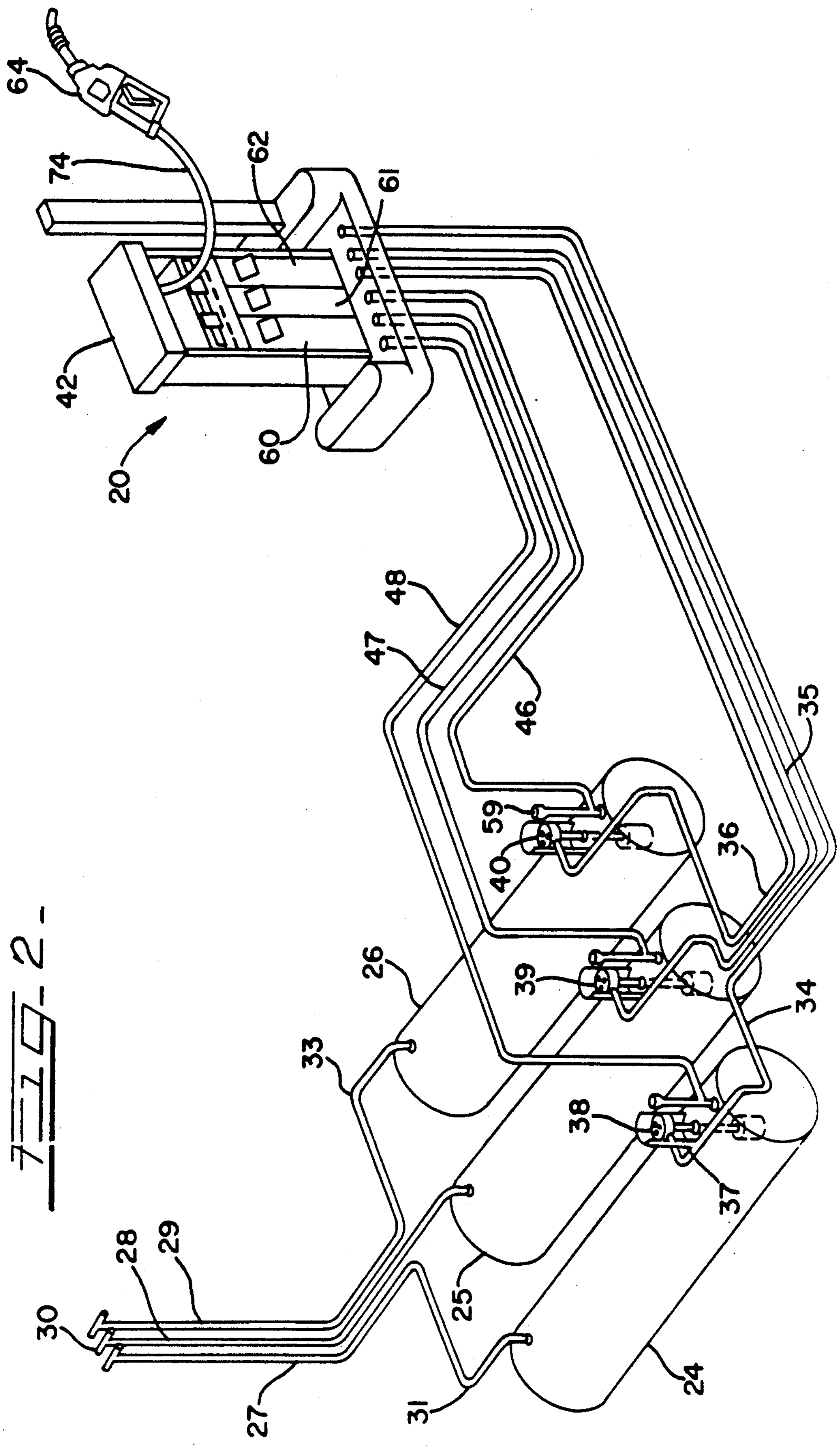
FIG. 2 is a perspective view of part of another Stage II Vapor Recovery System with separate vapor return lines connected to each of the underground storage tanks.

Upright vertical vent pipes 27–29 (FIG. 1) are connected through horizontal vent lines 31–33 to the underground storage tanks 24–26 to vent and atmospheric balance the underground storage tanks 24–26. The vent pipes 27–29 can be equipped with vacuum vent caps 30, such as at one-half ounce vacuum pressure. The vent caps 30 provide pressure relief valves which open when the pressure in the underground storage tanks 24–26 rises too high. Fuel flow pipe lines and conduits 34–36 extend between, are connected to and communicate with the underground storage tanks 24–26 and a series, set, and array of upright dispensing units 42–45 to convey gasoline from the underground storage tanks 24–26 to the dispensing units 42–45. An array, series or set of fuel pumps 37 pump the gasoline from the storage tanks 24–26 to the dispensing units 42–45 via fuel lines 34–36. The fuel pumps 37 can include storage tank pump assemblies 38–40, such as submerged pumps which are at least partially positioned and submerged in the underground storage tanks 24–26. Suction fuel pumps 41, located in the bottom portion of the dispensing units 42–45, can be used in lieu of the storage tank pumps 38–40, if desired. Vapor return pipe lines and conduits 50–56 extend between, connect and communicate with the dispensing unit 42–45 and a manifold 58 comprising a common manifold line extending between and communicating with the underground storage tanks 24–26. The manifold 58 can also be equipped with extractable check valve assemblies 59 which serve to prevent product flow between tanks through the manifold 58, if desired. The vapor return lines 50–56 pass gasoline vapors from the dispensing units 42–45 to the underground storage tanks 24–26. In some circumstances, it may be desirable to convey the vapors to separate underground storage tanks 24–26 via separate vapor return lines or pipes 46–48 without a manifold, as shown in FIG. 2, so as not to mix the vapors from different grades of gasoline.

Figure 3:
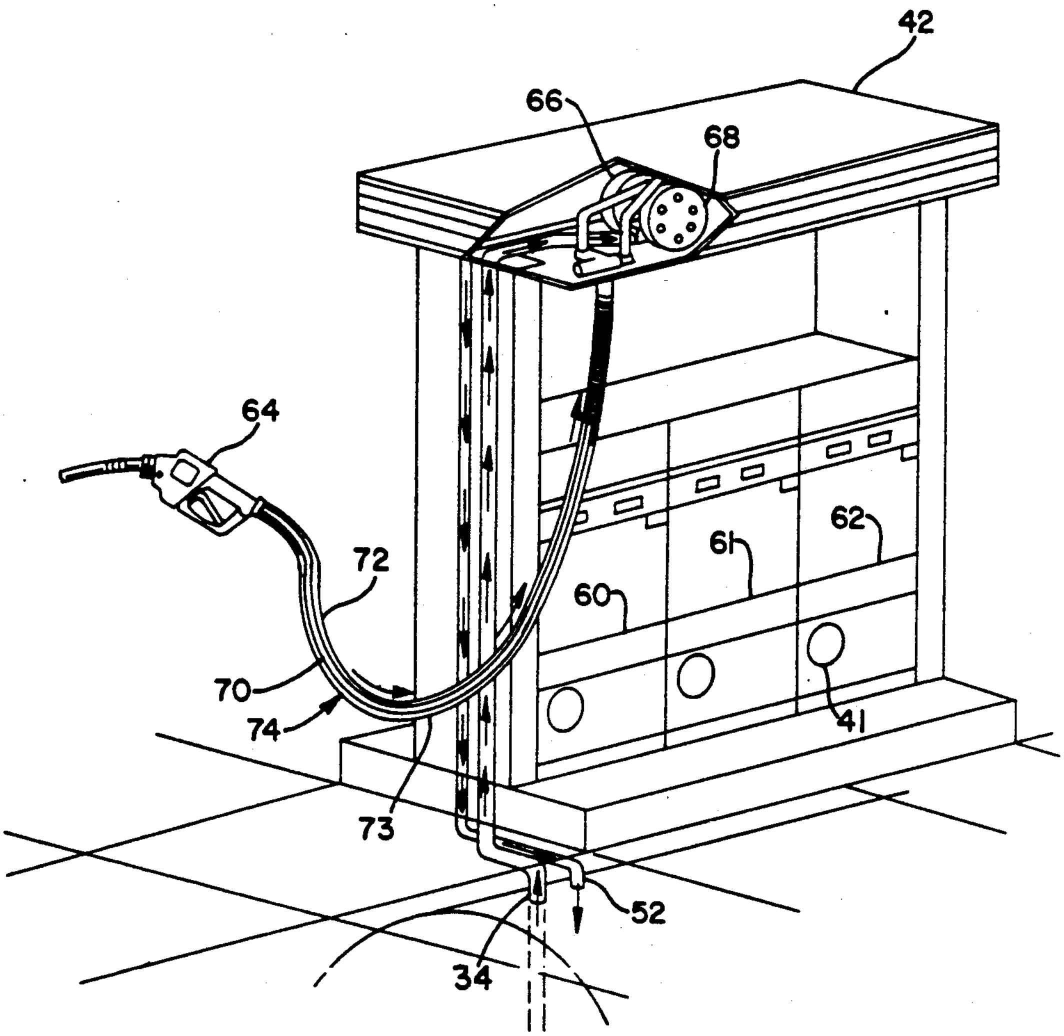
FIG. 3 is a perspective view of a dispensing unit with a top portion of the dispensing unit broken away for ease of understanding and clarity.

As best shown in FIG. 3, each of the dispensing units comprises upright elongated dispensers 60–62 with a separate dispenser for each of the grades of gasoline. Each of the dispensers 60–62 can have at least one multipurpose Stage II Vapor Recovery, flow control, condensate removal, fuel dispensing nozzle 64 and preferably a front flow control nozzle along the front of the dispenser and a back flow control nozzle along the back of the dispenser. Each nozzle dispenses a grade of gasoline corresponding to the gasoline in the dispenser to which the nozzle in associated. The nozzles are structurally identical. In some circumstances and where regulation permits, it may be desirable to connect the nozzle in parallel to all three dispensers 60–62 so that a single nozzle 65 (FIG. 1) can dispense different products, i.e. different grades of gasoline, via a nozzle control valve 67, as selected by the customer.

Each dispenser 60–62 (FIG. 3) can have a fuel motor or gasoline turbine 66 and a vapor pump 68 which are operatively connected to each other and communicate with the nozzles 64. In the preferred embodiment, the vapor pump 68 comprises a twin rotor vane pump connected along a common shaft. Flexible fuel hoses or fueling hoses 70 extend between, are connected to and communicate with the nozzles 64 and the dispensers 60–62. Flexible vapor return hoses 72 extend between, are connected to, and communicate with the nozzles 64 and the vapor pumps 68 of the dispensers 60–62. In the preferred embodiment, the vapor hose 72 annularly surrounds and cooperates with the fuel hose 70 to provide a user friendly coaxial hose assembly 74 between the nozzles 64 and the dispensers 60–62. The coaxial hose assembly 74 is more compact, less burdensome, and easier to use than independent separately spaced fuel hoses and vapor hoses. The volatilized hydrocarbon vapors (gasoline vapors) are withdrawn under suction pressure by the vapor pumps 68 through the vapor return hoses 72 and then passed to the underground storage tanks 24–26 (FIG. 1) via the vapor return lines 50–56 and the manifold 58.

Multi-Purpose Nozzles General

Each multi-purpose flow control nozzle 64 (FIG. 3) controls dispensing, discharging, and feeding of fuel (gasoline) into a filler pipe or fill opening of a consumer's tank, such as a customer's motor vehicle tank. Furthermore, each flow control nozzle 64 recovers volatilized hydrocarbon vapors (gasoline vapors) emitted from the filler pipe of a customer's tank during fueling, and collects condensed hydrocarbon vapors (gasoline condensate) which have collected in the U-shape bight portion 73 of the vapor return hoses 72.

Figure 4:
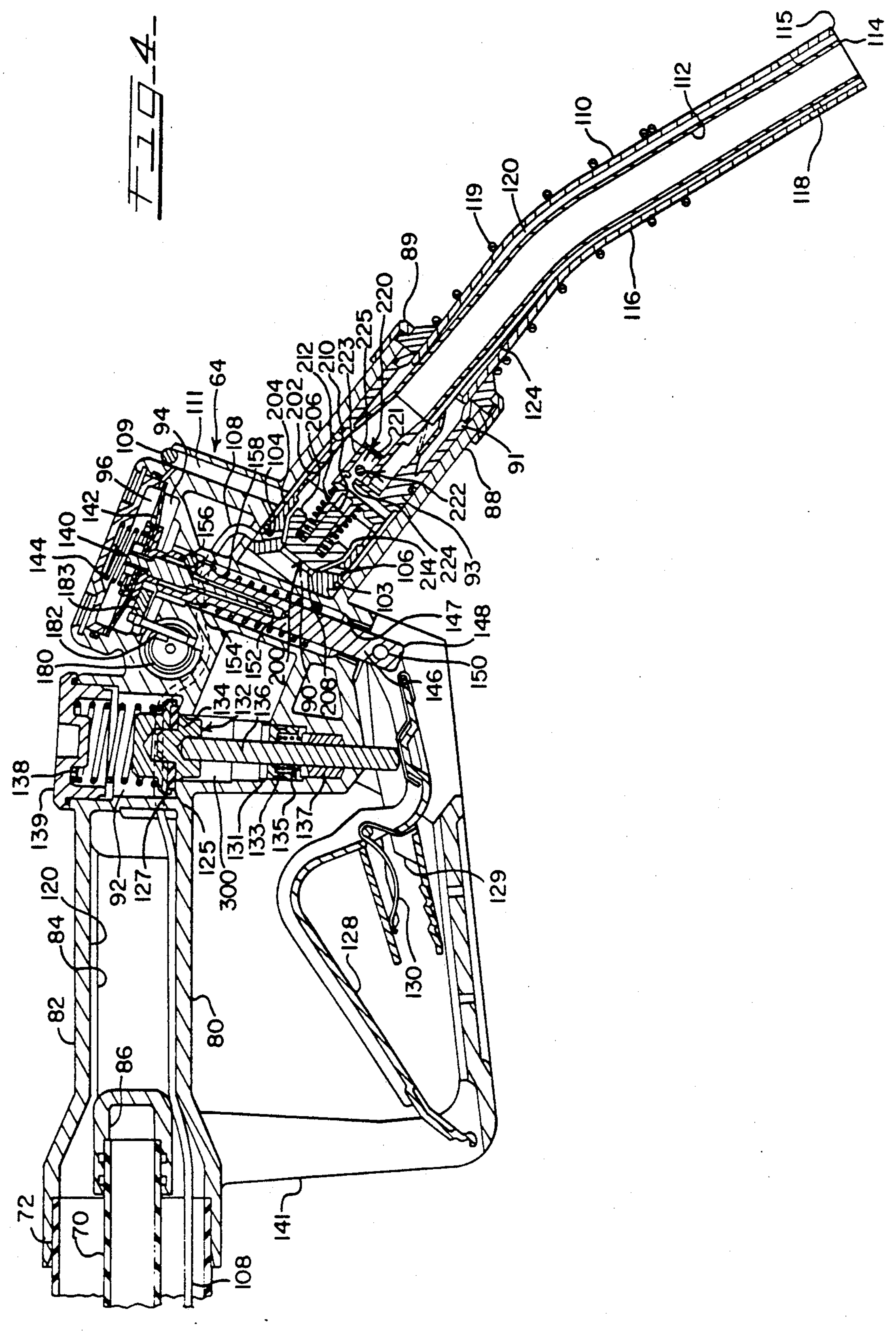
FIG. 4 is an enlarged cross-sectional view of an improved multi-purpose nozzle for use with the Stage II Vapor Recovery Systems of FIGS. 1 and 2 and showing the nozzle in a closed storage position prior dispensing and flow of gasoline.
Figure 5:
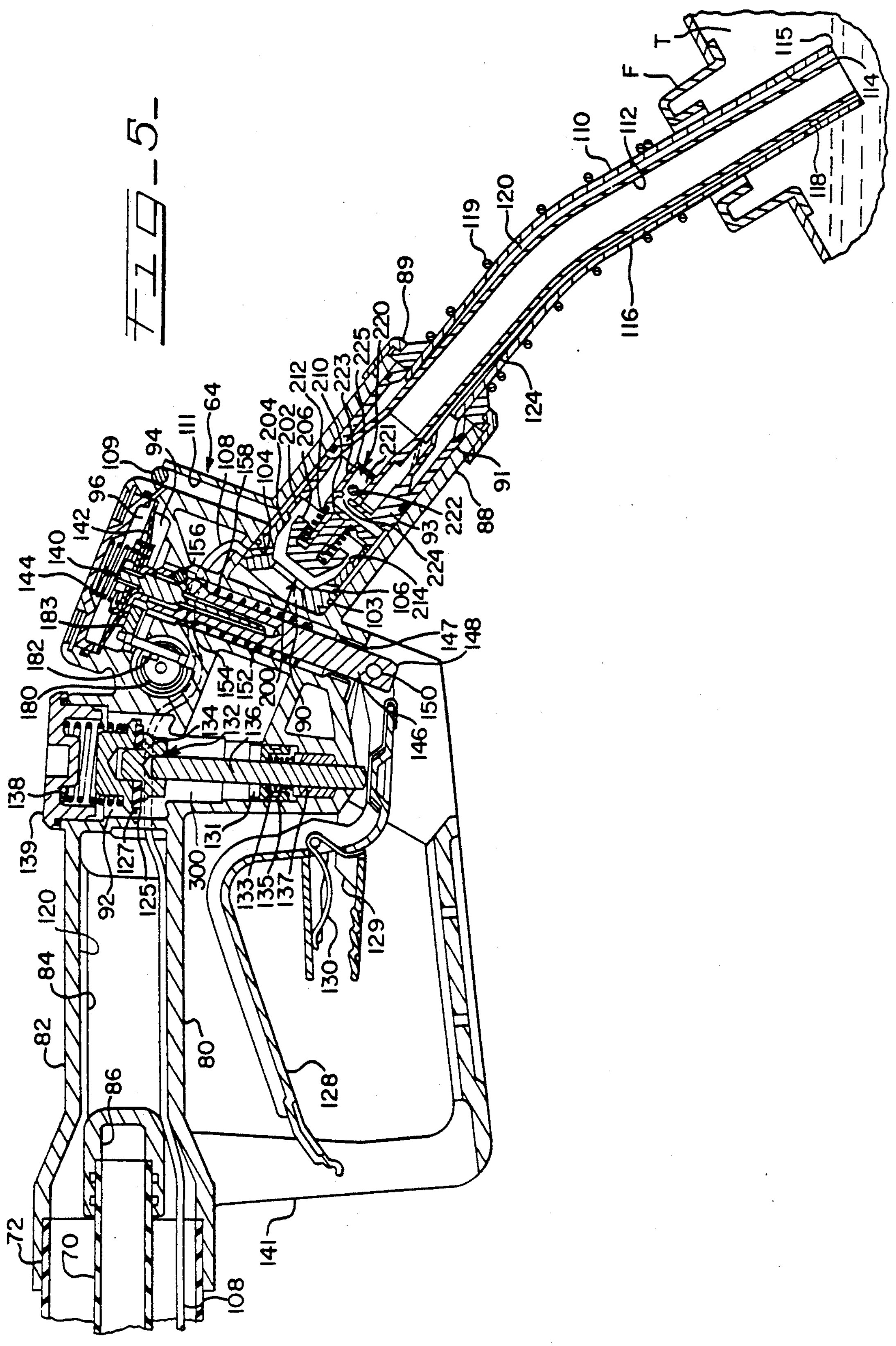
FIG. 5 is an enlarged cross-sectional view of the nozzle during fueling with dispensing and flow of gasoline.
Figures 6, 6A:
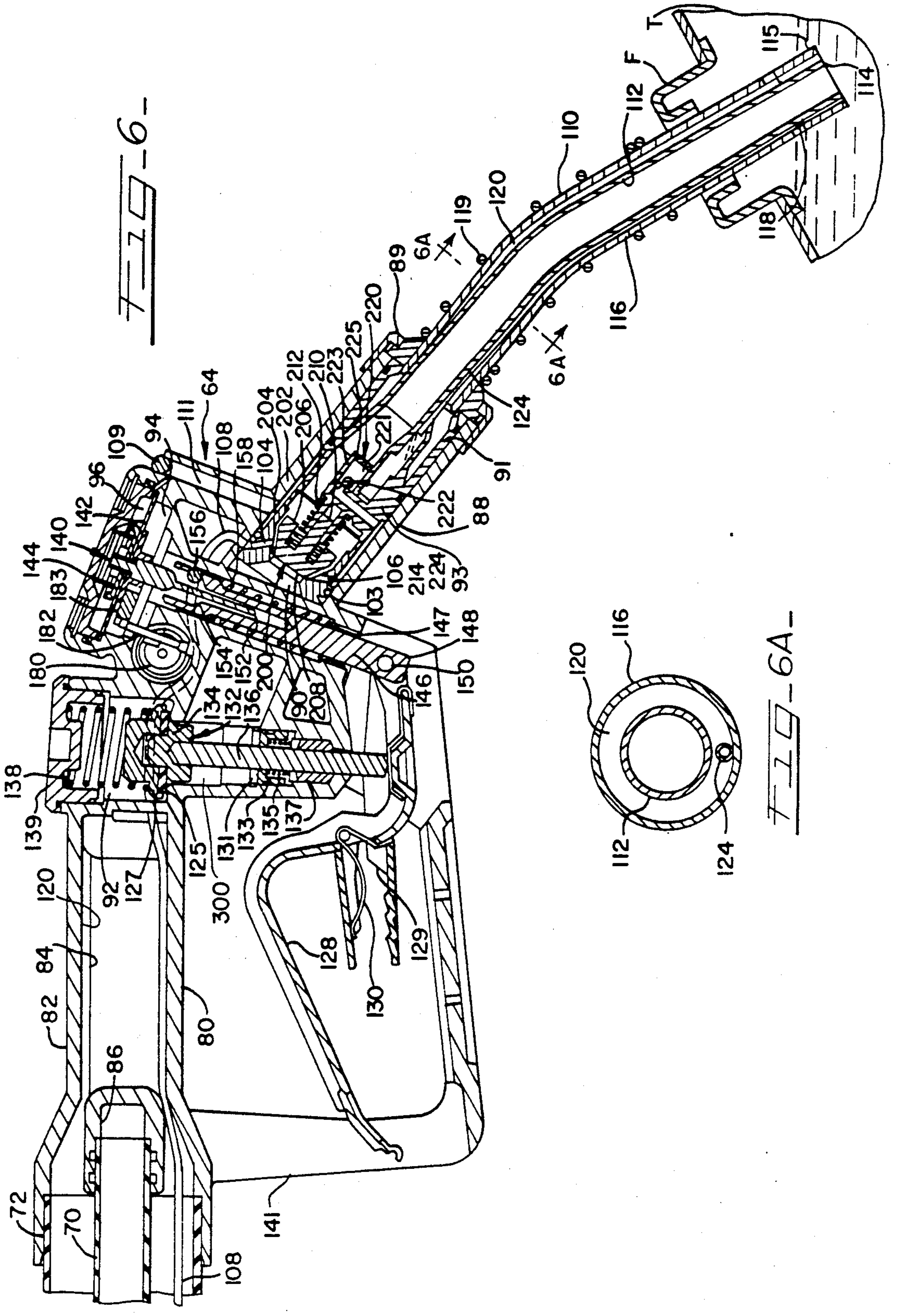
FIG. 6 is an enlarged cross-sectional view of the nozzle when the filler pipe of the customer's tank has reached a full condition.
FIG. 6A is a cross-sectional view of the nozzle taken substantially along line 6A—6A of FIG. 6.

As shown in FIGS. 4–6, each of the flow control nozzles 64 has a housing 80 providing a nozzle body. The housing 80 has a tubular handle or barrel 82 containing an inlet conduit 84 with a fuel inlet 86 connected to and communicating with the fuel hose 70. Part of the nozzle body 80 can be covered with vinyl of other elastomeric material or plastic, to enhance the insulation and appearance of the nozzle 64. The nozzle body of the housing 80 has a spout-receiving socket 88 and a venturi sleeve-receiving chamber, cavity, and compartment 90 which can be positioned adjacent the spout-receiving socket 88 and rearwardly of the spout nut 89, and spout spacer 91, and coaxial spout insert 93. Nozzle body 80 also has a flow control valve-receiving compartment and chamber 92 which is positioned adjacent the handle 82 and has an automatic shutoff valve-receiving compartment and cavity 94 providing a vacuum chamber 96 at the top of the automatic shutoff valve-receiving compartment 94.

Figure 7:
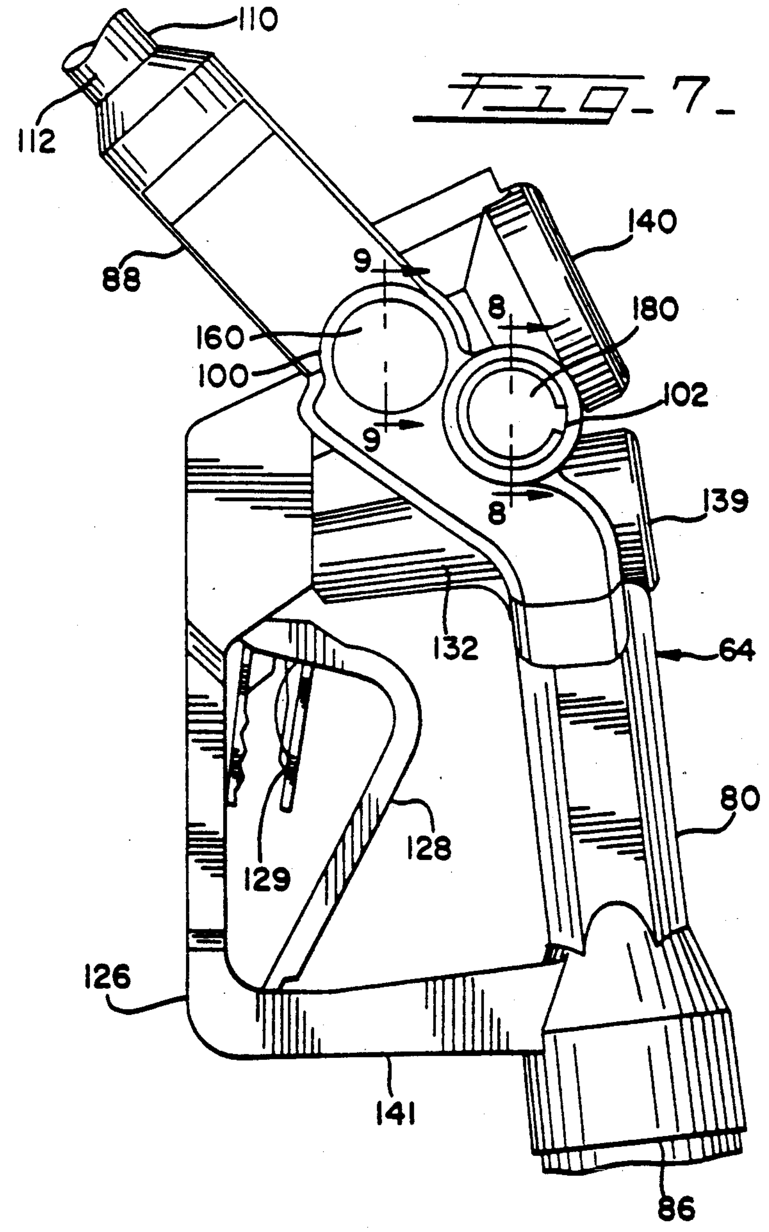
FIG. 7 is a fragmentary side view of the nozzle.

As shown in FIG. 7, the nozzle body 80 has a vapor valve-receiving compartment and chamber 100 as well as a prepay valve-receiving compartment and chamber 102. The vapor valve-receiving compartment 100 and the prepaid valve-receiving compartment 102 are positioned in proximity to each other and near the venturi sleeve-receiving chamber 90.

As shown in FIGS. 4–6, the venturi-sleeve receiving chamber 90 has orifices or apertures adjacent an O-ring 103, including a condensate venturi port 104 and an overfill sensing venturi port 106 which communicates with the vaccum chamber 96. An elongated gasoline condensate liquid-pickup tube 108, sometimes referred to as a "slurpy", is connected to, communicates with, and extends from the condensate venturi port 104 of the venturi-sleeve receiving chamber 90 through the tubular handle 82 into the vapor return hose 72. A ball plug 109 seals the automatic shutoff signal pressure channel or chamber 111 located above the forward end of the condensate liquid pickup tube 108 and above the condensate pickup port 104. The condensate liquid pickup tube 108, through the venturi action and suction pressure of the condensate pickup port 104 withdraws, aspirates, and removes condensed gasoline vapors (condensate) collecting in the U-shaped bight 73 of the vapor return hose 72.

The flow control nozzle 64 has an outer spout assembly 110 (FIG. 4) which extends into and engages the spout-receiving socket 88. The outer spout assembly 110 receives an elongated inner spout 112 which provides a fuel conduit. The inner fuel spout 112 has an outer tip 114 which provides a fuel outlet to discharge gasoline into the filler pipe of the customer's tank during fueling. The outer spout assembly 110 comprises an outer vapor spout and conduit 116 with openings or apertures which provide a vapor inlet 118. The vapor inlet 118 is spaced rearwardly of the fuel outlet 114 and spout insert riser 115. The spout insert riser 115 comprises a reinforcing sleeve, collar or guide ring which extends axially from the tip 114 of the nozzle 64 about one spout diameter. Collar 115 locates the inner fuel spout 112 and helps assure that the fuel spout 112 is aligned and properly engaged in the filler pipe or fill opening of the customer's vehicle tank. The fuel spout 112 can be made of hydrocarbon corrosive-resistant metal or plastic.

The vapor return spout 116 annularly surrounds the fuel spout 112 and has coaxial portions which are coaxially positioned about the fuel spout 112. The vapor return spout 116 is shorter than the fuel spout 112. A coil spout spring 119 can be positioned about an intermediate portion of the outer vapor spout 116. The vapor return spout 116 is also spaced outwardly from and cooperates with the fuel spout 112 to provide an annular vapor return passageway 120 in communication with the vapor return hose 72 to convey, aspirate, and pass vapors from the vapor inlet 118 to the vapor return hose 72. The vapor spout 116 withdraws, removes, and returns a substantial amount of gasoline vapors emitted from the fill opening or filler pipe of the customer's tank during fueling.

The dual spout assembly 110 (FIG. 4) preferably has an elongated liquid sensing automatic shutoff vent tube 124 (FIGS. 4 and 6*a*) which is positioned in the annular vapor return passageway 120 (FIG. 4) and extends from adjacent the vapor inlet 118 into the coaxial spout insert 93. The liquid sensing tube 124 communicates with the overfill sensing venturi port 106 in the venturi-sleeve receiving chamber 90 to sense the presence of a full condition of liquid gasoline in the filler pipe of the customer's motor vehicle tank. Desirably, the liquid sensing tube 124 increases the sensitivity, reliability, and reaction time of sensing a full condition in the customer's tank.

The flow control nozzle (FIGS. 4–6) has a manually operable lever 128 which is positioned below the nozzle housing 80. The hand-held lever 128 manually controls the flow of gasoline being discharged through the fuel spout 112. The lever 128 has a latch plate 129 and lever spring 130. The lever 128 is movable from a downward closed position (FIG. 4) to an upward fueling position (FIG. 5). A lever guard 141 is positioned partially about the lever 128. The lever guard 141 is connected to the handle 82 and nozzle body 80.

Flow Control Valve Assembly

The nozzle 64 (FIGS. 4–6) has a flow control valve assembly 132 disposed in the flow control valve-receiving compartment 92. The flow control valve assembly 132 is actuated by the lever 128 to regulate the flow of gasoline into the fuel spout 112 via chamber 300. The flow control valve assembly 132 has a flow control poppet valve 134, an elongated valve stem 136 to engage the lever 128, and a flow control valve-compression spring 138 to urge the lever 128 and the poppet valve 134 in a normally closed position to block (stop) the flow and discharging of gasoline. The actuating valve stem 136 is contained at its upper end by the poppet valve 134 and is moved at its lower end by the manual lever 128. Packing nut 131 and packing retainer 133 provide an upward abutment wall acting against a packing spring 135 to retain the packing 137 in order to prevent leakage of fuel about the valve stem 136. The compression spring 138 urges the main poppet valve 134 to its closed position. A spring cap 139 provides an abutment stop against one end of the spring 138 to retain the spring 138. The flow control valve assembly has a poppet disc or seat ring 125 held by a poppet disc holder 127.

Automatic Shutoff Valve Assembly

The flow control nozzle 64 (FIGS. 4–6) has an automatic shutoff overfill valve assembly 140 which is disposed in the automatic shutoff valve-receiving compartment 94 at a location rearwardly of the air passage ball plug 109. The automatic shutoff valve assembly 140 shuts off, stops and blocks the flow of fuel when the customer's tank is in a full, filled, and overfill condition.

The automatic shutoff valve assembly 140 has a diaphragm 142 which is positioned adjacent the vacuum chamber 96. The diaphragm 142 communicates with and cooperates with the overfill sensing venturi port 106 to automatically shutoff and stop the flow of gasoline to the customer's tank in a full condition. The automatic shutoff valve assembly 140 has a compression diaphragm-spring 144 which is positioned above the diaphragm 142 to exert a spring force against the diaphragm 142. An automatic shutoff plunger 146 is positioned below the diaphragm 142 and slides in a plunger bushing 147. The lower end 148 of the plunger 146 is pivotally connected to the lever 128 via a pivot pin 150. A reciprocatable latch pin 152 is slidably positioned in the plunger 146. A tapered head 154 is connected to and positioned above the latch pin 152. Metal or plastic latch balls 156 are seated in the plunger 146 adjacent the tapered head 154. The latch pin 152 is disposed between three balls 156 which are positioned within passages in the latch plunger 146. When the latch retaining pin 152 is in the position shown in FIGS. 4 and 5, the balls 156 prevent downward movement of the plunger 146. A plunger coil spring 158 is positioned about the plunger 146 to urge the plunger upwardly.

As shown in FIG. 6, the diaphragm 142 moves upwardly when the gasoline being dispensed in the customer's tank reaches a full condition. Upward movement of the diaphragm 142 causes concurrent upward movement of the latch pin 152. When the latch pin 152 moves upwardly, the tapered portion 154 of the latch pin is withdrawn from between the balls 156, allowing the balls to move inwardly to allow the plunger 146 to be moved downwardly against the force of the coil spring 158. When the diaphragm 142 moves upwardly to pull the latch retaining pin 152 and release the latch plunger 146 from the balls 156, the force of the spring 138 acting on lever 128 closes the main poppet valve 134. Compression spring 144 exerts a force against the upper surface of the diaphragm 142 and along with coil spring 158 determines the partial vacuum at which the diaphragm 142 moves upwardly. Springs 144 and 158 urge the latch pin 152 to return to its latching position after shutoff has occurred.

When fuel is present in the vapor inlet 118 as sensed by the liquid sensing tube 124, the partial vacuum in the overfill sensing port 106 and in the vacuum chamber 96, is increased causing the diaphragm 142 to overcome the force of the compression spring 144 and activate the latch retaining pin 152 to close the liquid flow control poppet valve 132 shutting off the flow of fuel.

The automatic shutoff valve assembly 140 controls the positions of the tapered latch pin 152 as well as the main flow valve 132 as a function of the pressure differential across the automatic shutoff diaphragm 142. The underside of the diaphragm 142 is at atmospheric pressure. The upper portion and top side of the diaphragm 142 is either at atmospheric pressure or a reduced suction pressure, depending on the presence or lack of presence of liquid at the tip of the liquid sensing tube 124. When the pressure in chamber 96 is at a reduced suction pressure, this causes the diaphragm 142 to move upwardly, withdrawing the latch pin 152 from the bore of the plunger, which releases the balls 156 and plunger 146. As a consequence, spring 138 causes the flow control valve 132 to close shutting off nozzle flow of fuel.

The function of the automatic shutoff assembly 140 has been sensitized by minimizing the aspirated liquid volume required to actuate the shutoff diaphragm 142. This is accomplished by the elongated liquid sensing tube 124 extending from the attitude shutoff vapor passage 220 to a location near the vapor inlet port 118 of the spout assembly 110.

Vapor Valve

The flow control nozzle 64 (FIG. 7) also includes a spring-biased vapor check valve 160 positioned in the vapor valve-receiving compartment 100. The vapor valve 160 substantially blocks and prevents the return flow of gasoline vapors except during fueling. In the illustrative embodiment the vapor valve (FIG. 9) has a rolling diaphragm 162 in communication with chamber 300, a vapor valve piston 164, an O ring 166, a diaphragm spring 168, a vapor valve support 170, a vapor valve seat 172, a vapor valve seal 174, and a freeze plug and cap 176.

The vapor check valve 160 can be held in a normally closed position by the diaphragm spring 168 to seal and close the vapor valve seal 174 on vapor valve seat 172. When the flow control poppet valve 134 is open as in FIG. 5, the fuel pressure forces the vapor valve rolling diaphragm 162 (FIG. 9) upwardly compressing the diaphragm spring 168 and opening the vapor valve. When the flow control poppet valve 134 is closed as in FIG. 6, the loss of fuel pressure allows the vapor valve 160 (FIG. 9) to close under diaphragm spring 168 load to prevent and block the flow of vapors therethrough, i.e. when dispensing of gasoline stops, the reduced fuel pressure on the vapor valve diaphragm 162 can no longer hold the vapor check valve 160 open.

Prepay Valve

The flow control nozzle 64 (FIG. 7) can further include a spring-biased prepay valve and assembly 180 positioned in the prepay valve-receiving compartment 102. The prepay valve 180 (FIG. 7) assures nozzle shutoff by closing the flow control valve 132 (FIG. 6) when flow of fuel is remotely terminated in the service station house (building) after a selected monetary amount or quantity of fuel has been metered through the dispenser.

Figure 8:
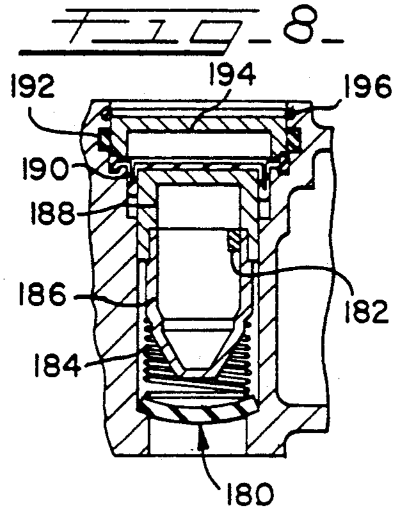
FIG. 8 is a cross-sectional view of a prepay valve assembly taken substantially along line 8—8 of FIG. 7.

The prepay valve 180 has an override trip lever 182 (FIG. 6) a trip lever insert 183. The trip lever 182 engages the diaphragm 142 of the automatic shutoff valve assembly 140 to substantially block and stop the flow of gasoline into the fuel spout 112 when a preselected monetary (e.g. 10 dollars) or quantity (e.g. 10 gallons) amount of gasoline has been discharged through the fuel spout 112 into the filler pipe of the customer's vehicle tank. The prepay valve and assembly 180 can have a rolling diaphragm support spring 184 (FIG. 8), a rolling diaphragm support body or piston 186, a rolling diaphragm support cap 188, a rolling diaphragm 190, an O ring 192, a pressure chamber cap 194, and an internal retaining ring 196.

Specifically, the prepay valve comprises a rolling diaphragm 190 (FIG. 8) and piston or body 186 connected to a trip lever 182 (FIG. 6) located below the diaphragm 142 connected to the tapered latch pin 152. As the fuel pressure under the rolling diaphragm cover 194 drops to atmospheric pressure, as the dispenser 60 (FIG. 3) is shutoff electronically for a prepay sale, the rolling diaphragm spring 184 (FIG. 8) shuttles the piston 186 toward the cover 194. The piston motion is transmitted through the connected trip lever 182 (FIG. 6) to cause the tapered latch pin 152 to withdraw from the bore of the operating lever plunger 146 which causes deactivation of the lever 128 in the same manner as described earlier for automatic shutoff.

When the prepay valve 180 (FIG. 8) and rolling diaphragm support body 186 move away from cover 194, the override trip lever 182 rotates so that its trip arm portion will move downwardly and out of the way of the diaphragm 142 (FIG. 5) to allow the diaphragm 142 to move downwardly to its operating position so that flow of fuel can be initiated with lever 128.

Venturi Sleeve Assembly

As shown in FIGS. 4–6, the flow control nozzle 64 has a venturi sleeve assembly 200 which is positioned in the venturi sleeve-receiving chamber 90. The venturi sleeve assembly 200 has an annular venturi sleeve 202 with a valve seat 204 that is disposed about, in proximity to, and adjacent the venturi ports 104 and 106. The venturi sleeve assembly 200 includes a venturi check valve 206 with a frustoconical throat plug 208 and a plug stem 210. A venturi check valve coil spring 212 is disposed about the plug stem 210 to urge the throat plug 208 in a normally closed seated position against the valve seat 204 to block the flow of gasoline into the fuel spout 112 except during a normal sale transaction. The throat plug 208 is movable to an open forward position to permit the discharge of metered gasoline and condensate from the condensate pickup tube (slurpy) 108 into the fuel spout 112 during fueling. In the open position, the throat plug 208 is spaced away and cooperates with the venturi sleeve 202 to form a venturi throat 214.

Figure 10:
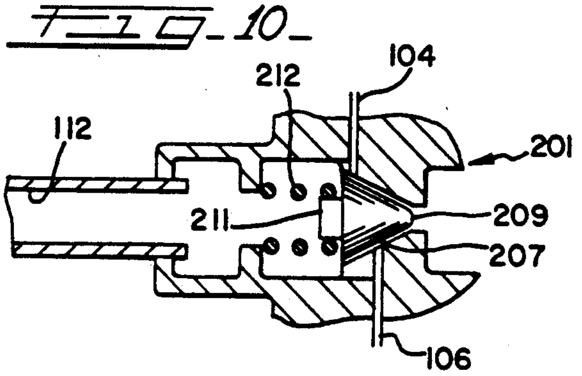
FIG. 10 is a fragmentary cross-sectional view of another venturi sleeve assembly for use with a multi-purpose nozzle of the Stage II Vapor Recovery System.

The venturi sleeve assembly 201 of FIG. 10 is structurally and functionally similar to the venturi sleeve assembly 200 shown in FIGS. 4–6, except that the throat plug 207 is generally triangular in shape with a rounded apex 209 and the stem 211 is somewhat shorter than the stem 210 of FIGS. 414 6.

Figure 11:
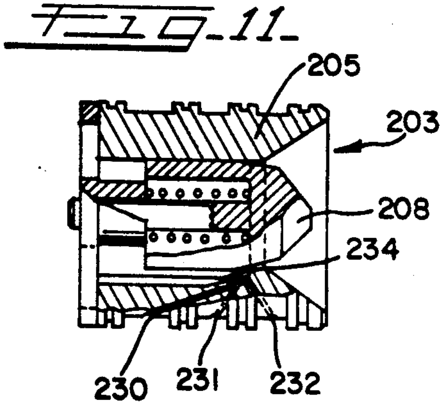
FIG. 11 is a fragmentary cross-sectional view of a further venturi sleeve assembly for use with a multi-purpose nozzle of the Stage II Vapor Recovery System.

The venturi sleeve assembly 203 of FIG. 11 is structurally and functionally similar to the venturi sleeve assembly 200 of FIGS. 4–6 except that the venturi sleeve assembly 205 has multiple liquid pickup points, apertures, orifices, or openings 230–232, which provide venturi throat ports. The venturi throat ports 230–232 can be separated by throat plug guide lands 234 in the orifice sleeve (venturi sleeve) 205 or in the frustoconical throat plug 208 with slots in the venturi sleeve 205. The throat plug 208 can be scalloped or undercut between the guide lands 234 for improved flow area as well as to maintain rotational positioning of the throat plug 208. At least one of the venturi throat ports provide a condensate pickup port. Preferably, at least one of the other venturi throat ports provide an overfill sensing port. More than one condensate pickup tube 108 (FIG. 4) can be used with the venturi assembly 203 of FIG. 11, if desired.

Figure 12:
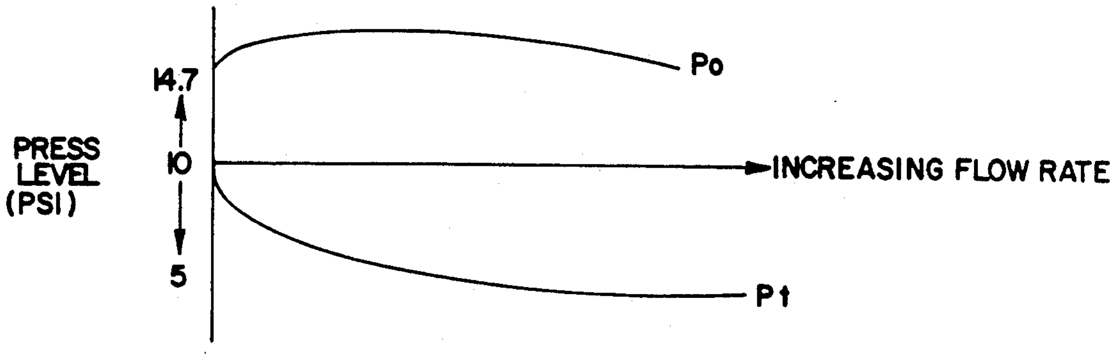
FIG. 12 is a chart illustrating the pressure level versus the suction and lift pressure of the multi-purpose nozzle.

The chart of FIG. 12 illustrates the venturi throat pressure Pt in relationship to the nozzle discharge pressure Po. The suction pressure or lift pressure can be determined by the formula Po−Pt or the difference between the nozzle discharge pressure and the venturi throat pressure.

Attitude Shutoff Assembly

The flow control nozzle 64 (FIGS. 4–6) can also include an attitude shutoff assembly and system 220 which is positioned between the plug stem 210 and the liquid sensing tube 124. The attitude shutoff assembly 220 has a ball valve 222 in an attitude sensing chamber 221 and has an attitude signal passageway 224 which communicates with the liquid sensing tube 124. The ball valve 222 is movable to an open position that is spaced away from the attitude passageway 224 as shown in FIG. 5 to permit flow of gasoline into the fuel spout 112. The ball valve 222 is also movable to a closed position as shown in FIG. 6, to substantially block the attitude passageway 224, which in turn seals the outlet of the liquid sensing tube 124, to simulate a full condition in the fill opening or filler pipe F of the customer's tank T. When the dual spout assembly 110 is orientated in an upward attitude the ball valve 222 moves to a closed position as shown in FIG. 6 to substantially prevent the discharge of gasoline through the fuel spout 112.

Specifically, the attitude shutoff system and assembly 220 comprises a ball 222 located in the attitude sensing chamber 221 through which the automatic shutoff sensing pressure is communicated to the automatic shutoff diaphragm 142. The attitude ball 222 is positioned in the attitude sensing chamber 221 within the attitude support body 223 rearwardly of an attitude tip end cap 225. When the nozzle spout assembly 110 is raised above a horizontal level, the loose attitude ball 222 closes off the sensing circuit just as if liquid were sensed and the nozzle operating lever 128 is deactivated, so that the nozzle shuts off in a manner similar to an automatic shutoff.

Operation

In the Stage II Vapor Recovery System and Process, gasoline or other liquid of volatilizable hydrocarbon fuel is stored and contained in underground storage tanks 24–26 (FIG. 1). Gasoline is pumped from the underground storage tanks 24–26 through fuel lines 34–36 to a series of dispensing units 42–45, while venting the underground storage tanks 24–26 to about atmospheric pressure via the vent lines 31–33 and vent pipes 27–29. Vent pipes 27–29 prevent air from flowing in and out of the storage tanks except during periods of excess pressure and gas expansion.

Gasoline is dispensed and metered from the dispensers 60–62 (FIG. 1) of the dispensing units 42–45 through coaxial hose assemblies 74 into flow control nozzles 64. The flow control nozzles 64 control the flow of gasoline and discharge the metered gasoline through the fuel spouts 112 (fuel outlet conduits) of the nozzles 64 into fill openings or filler pipes F (FIG. 5) of customer's motorized vehicle tanks T during fueling. Gasoline vapors are emitted from the filler pipes of the customers' vehicle tanks during discharging of gasoline (fueling).

Concurrently, a substantial amount of the vapors emitted from the fill opening or filler pipe F of the customers' vehicle tanks T during fueling are captured, drawn and aspirated into vapor inlets 118 (FIG. 5) of the outer vapor spouts 116 of the nozzle 64 under suction pressure of the vacuum pumps 68 (FIG. 3). The vapors drawn and collected into the nozzles 64 are passed through the annular vapor return passageway 120 (FIG. 5) of the vapor return conduits 116 about the fuel spouts 112 in countercurrent flow relationship to the discharging metered gasoline flowing out of the fuel spouts 112. Vapor pumps 68 (FIG. 3) also direct the vapors from the annular vapor return passageways 120 (FIG. 5) through the vapor return hoses 72 (FIG. 3) about the fuel hoses 70 in countercurrent flow relationship to the gasoline being dispensed in the fuel hoses 70. Vapor pumps 68 further convey the vapors from the vapor return hoses 72 through the vapor return lines 50–56 (FIG. 1) into the underground storage tanks 24–26 via manifold 58, in countercurrent flow relationship to the gasoline being pumped through the fuel lines 34–36. Vapor preferentially flows to the volume of the storage tank 24, 25 or 26 being emptied or reduced. The vapor recovery nozzle 64 captures 95% or more of the vapors emitted from the customer's tank.

The vehicle tank can be at temperatures of 120° F. or hotter and is heated from the heat generated by the vehicle engine. The vehicle tank is much hotter than the vapor return hose 72, which is at ambient temperature, typically 70° F. to 80° F. in many parts of the country, but often at around freezing during winter and at mountain elevations. The difference in temperature between the vehicle tank and the vapor return hose 72, as well as the difference in flow area, pressure, and velocity cause some of the captured hydrocarbon vapors to condense in the lower bight portion 73 (FIG. 3) of the vapor return hose. During winter or colder months, this condition is aggravated due to the greater difference in temperature between the hotter vehicle tank and the colder vapor return hose 72.

During vapor recovery, at least some of the gasoline vapors in the vapor return hoses 72 (FIG. 3) condense and collect in the lower U-shaped bight portion 73 of the vapor return hoses 72 to form gasoline condensate. In order to minimize blockage of vapors being directed through the vapor return hoses 72, the condensate in the vapor return hoses is aspirated, withdrawn and removed during fueling via the condensate pickup tubes 108 (FIG. 5) and by suction pressure in the condensate pickup ports 104 of the nozzle 64. The condensate is passed, aspirated and conveyed through the condensate liquid pickup tubes 108 by suction pressure and venturi action, in countercurrent flow relationship to the returning vapors being conveyed through the vapor return hoses 72 (FIG. 3). The aspirated removed condensate is fed through the fuel spouts 112 (FIG. 5) of the nozzles 64 into the fill opening or filler pipes F of the customers' vehicle tanks T during fueling in concurrent comingled flow relationship with the discharging gasoline flowing out through the fuel spouts 112.

In the preferred process, at least a portion of the returning vapors are directed coaxially about the gasoline being dispensed in the fuel hoses 70 (FIG. 5) and are passed through the annular vapor return conduits 120 and vapor spouts 116 in coaxial counterflow relationship to the discharging gasoline flowing out of the fuel spouts 112.

During fueling, when the lever 128 (FIG. 5) is squeezed, the valve stem 136 moves upwardly compressing spring 138 and lifting flow valve (poppet valve) 132 to permit the flow of fuel (such as gasoline). The resulting fuel pressure within chamber 90 pushes the venturi valve (throat plug) 208 forwardly (downstream), compressing spring 212 to allow flow of fuel out of the fuel spout 112. Flow of fuel through the throat of the venturi assembly 200 creates a suction at venturi ports 104 and 106. Hydrocarbon vapors and air are drawn in through the vapor inlet 118 and conveyed through the annular passageway 120 during fueling. Gasoline condensate (condensed gasoline vapors) collected in the U-shaped bight portion 73 (FIG. 3) of the vapor return hose 72 are captured and aspirated through the condensate liquid pickup tube 108 and conveyed through the fuel spout 112 into the filler pipe or fill opening F of the customer's tank T during fueling.

Dispensing and metering of gasoline can be stopped in a number of ways: (1) by manually closing the lever 128 as shown in FIG. 4; (2) automatically by the liquid sensing tube 124 and automatic shutoff valve assembly 140 as shown in FIG. 6 when the presence of gasoline in the vapor inlet 118 has been sensed by the liquid sensing tube 124 in response to a full condition in the customers' tank T; (3) automatically by the attitude shutoff assembly 220 as shown in FIG. 6 by plugging discharge (communication) of the liquid sensing tube 124 when the spout assembly 110 of the nozzle 64 is moved, tilted or otherwise orientated to an upward position; and (4) by a remote prepay control console in the service station house activated when a preselected amount of gasoline has been dispensed from the dispensers.

In a full condition, gasoline in the customer's vehicle tank T will rise to, cover and enter the vapor inlet 118 (FIG. 6) which blocks the front end of the liquid sensing tube 124. This causes the diaphragm 142 pressure in chamber 96 to drop to venturi port 106 suction pressure level below atmospheric pressure because air and vapors are not entering the vapor inlet 118. Since the atmospheric pressure below diaphragm 142 is now greater than the venturi port 106 pressure above the diaphragm 142, the diaphragm 142 will move upwardly to lift the tapered pin 152 upwardly and partially out of the plunger 146. As this occurs, the balls 156 move toward the smaller tapered portion of the pin 152. Consequently, the spring load of the flow valve spring 138 acting through the valve stem 136 and lever 128 will pull the plunger 146 downwardly so that the flow control poppet valve 134 is seated in a closed position, blocking further flow of fuel. Simultaneously, the vapor valve 160 (FIG. 9) moves to its closed position via the diaphragm spring 168. Consequently, condensate collection, pickup, aspiration and removal stop because there is no longer adequate suction pressure at the condensate pickup port 104 because of flow shutoff (fuel stoppage).

Figure 9:
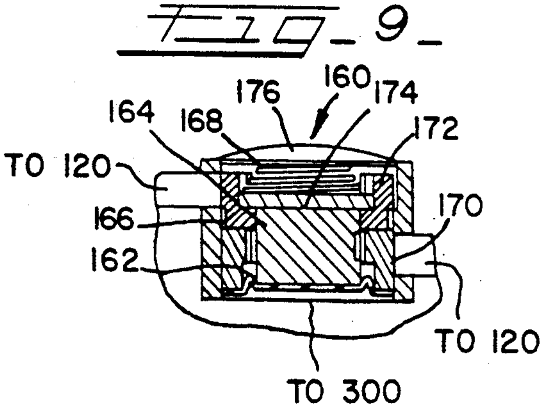
FIG. 9 is a cross-sectional view of a vapor valve assembly taken substantially along line 9—9 of FIG. 7.

The venturi check valve assembly 200 (FIG. 4) comprising the throat plug 208 prevents unauthorized draining and dispensing of gasoline in the fuel hose 70. When dispensing, metering, and discharging of gasoline has ceased (stopped), vapor capture, aspiration, withdrawal, collection and removal are stopped by the vapor valve 160 (FIGS. 7 and 9). Stopping the metering, dispensing and discharging of gasoline as discussed above creates a change in the venturi pressure at the condensate pickup ports 104 (FIG. 6), i.e. the suction pressure becomes atmospheric pressure at the condensate pickup ports 104 and in the overfill sensing ports 106, which ceases (stops) the aspiration and withdrawal of gasoline condensate through the liquid pickup tubes 108. When the metering and flow of gasoline is stopped, the check valve 206 of the venturi sleeve assembly 200 moves rearwardly as shown in FIG. 6 to block the outward flow and discharge of gasoline through the fuel spouts 112 and prevent unauthorized drainage and discharging of gasoline in the fuel hoses 70 through the nozzles 64.

Desirably, the multi-purpose nozzle 64 increases the flow rate of gasoline by about 20% or about one and one-half gallons per minute over conventional vapor recovery nozzles using add-on condensate removal devices.

Advantageously, the novel multi-purpose nozzle and Stage II Vapor Recovery System and Process generally provide an efficiency of an efficiency of at least 95% vapor recovery and do not experience the efficiency degradation from bellows damage and failure typical to prior art balance recovery nozzles and systems.

Among the many advantages of the novel flow control nozzle and Stage II Vapor Recovery System and Process are:

1. Outstanding performance.
2. Excellent capture of hydrocarbon vapors emitted from customers' tanks during fueling.
3. Superior removal of condensed gasoline vapors (condensate).
4. Better fuel throughput and control of hydrocarbon emissions.
5. Reduction of hydrocarbon vapor discharge to the atmosphere during fueling.
6. Increased delivery and flow rate of fuel to customer tanks.
7. Decreased customer fuel costs.
8. Improved condensate aspiration and return of hydrocarbon vapors.
9. Compliance with the Clean Air Act.
10. Enhanced environmental protection.
11. Economical.
12. Reliable.
13. Efficient.
14. Effective.

The multi-purpose nozzle and Stage II Vapor Recovery System and Process is particularly useful for dispensing gasoline, petrol, or other liquid volatilizable hydrocarbon fuel into a motor vehicle tank of an automobile, bus, motorcycle, truck, van, motor home, and recreational vehicle. They can also be used in a tank(s) of a boat, tractor or other farm equipment, road grading equipment, other machinery, and off road vehicles. Furthermore, the tank can comprise a gas can or other container for use in lawn mowers or for internal combustion engines of other power-driven equipment, propelled by gasoline, petrol, or other liquid volatilizable hydrocarbon fuel.

Although embodiments of the invention have been shown and described, it is to be understood that various modifications and substitutions, as well as rearrangements of parts and process steps, can be made by those skilled in the art without departing from the novel spirit and scope of the invention.

What is claimed is:

1. A vapor recovery system, comprising:

a set of elongated underground storage tanks, each storage tank containing a different grade of gasoline;

vent pipes connected to said storage tanks for venting and pressure balancing of said storage tanks;

a series of dispensing units;

fuel flow lines extending between, connected to and communicating with said storage tanks and said dispensing units for conveying gasoline from said storage tanks to said dispensing units;

vapor return lines extending between, connected to and communicating with said storage tanks and said dispensing units for passing gasoline vapors from said dispensing units to said storage tanks;

an array of fuel pumps for pumping gasoline from said storage tanks to said dispenser units, said fuel pumps comprising pumps selected from the group consisting of submerged pumps in said underground storage tanks and suction pumps in said dispensing units;

each of said dispensing units comprising at least one: upright dispenser;

fuel dispensing nozzle;

a fuel hose extending between and connected to said nozzle and said dispenser;

a vapor return hose extending between and connected to said nozzle and said dispenser;

a vapor pump operatively connected to said nozzle via said vapor return hose;

each of said nozzles comprising a housing providing a body, said housing having a tubular handle containing an inlet conduit with a fuel inlet connected to and communicating with a fuel hose, said body having a spout-receiving socket, a venturi sleeve-receiving chamber, a flow control valve-receiving compartment positioned adjacent said handle, an automatic shutoff valve-receiving compartment providing a vacuum chamber positioned between said venturi sleeve-receiving chamber and said automatic shutoff valve-receiving compartment, and said venturi-sleeve receiving chamber defining orifices providing a condensate venturi port and an overfill sensing venturi port communicating with said vacuum chamber;

an elongated condensate liquid pickup tube connected to, communicating with and extending from said condensate venturi port of said venturi-sleeve receiving chamber through said inlet conduit into said vapor return hose for substantially removing condensed gasoline vapors forming condensate collecting in said vapor return hose;

an elongated inner spout providing a fuel conduit and having an outer tip defining a fuel outlet for discharging gasoline into a filler pipe of a motor vehicle tank during fueling;

an outer spout assembly extending into and engaging said spout-receiving socket, said outer spout assembly comprising an outer spout providing a vapor return conduit and defining apertures providing a vapor inlet spaced from said fuel outlet for withdrawing, removing, and returning a substantial amount of gasoline vapors emitted during said fueling, said vapor return conduit annularly surrounding said fuel conduit and having coaxial portions coaxially positioned about said fuel conduit, said vapor return conduit being shorter than said fuel conduit and being spaced outwardly from and cooperating with said fuel conduit to define an annular vapor return passageway in communication with said vapor return hose;

an elongated liquid sensing tube positioned in said annular vapor return passageway and extending from adjacent said vapor inlet into said spout-receiving socket, said liquid sensing tube communicating with said overfill sensing venturi port in said venturi-sleeve receiving chamber for sensing the presence of a full condition of liquid gasoline in the filler pipe of the motor vehicle tank;

a manually operable level positioned below said handle for manually controlling the flow of gasoline being discharged through said fuel conduit, said lever being moveable from a downward closed position to an upward position, and a lever guard positioned partially about said lever and connected to said handle and body of said housing;

a flow control valve assembly disposed in said flow control valve-receiving compartment and being actuated by said lever for regulating the flow of gasoline into said fuel conduit, said flow control valve assembly having a flow control poppet valve, an elongated valve stem engaging said lever, and a flow control valve-compression spring for urging said lever and poppet valve in a normally closed position blocking the flow of gasoline;

an automatic shutoff valve assembly disposed in said automatic shutoff valve-receiving compartment, said automatic shutoff valve assembly having a diaphragm positioned adjacent said vacuum chamber and communicating with said overfill sensing venturi port for automatically shutting off the flow of gasoline to said fuel conduit in said full condition, a compression diaphragm-spring positioned above said diaphragm for exerting a spring force against said diaphragm, a plunger positioned below said diaphragm and having a lower end pivotally connected to said lever, a reciprocatable latch pin slidably positioned in said plunger, a tapered head connected to and positioned above said pin, balls seated in said plunger for engaging said head, and a plunger spring for urging said plunger upwardly; and a venturi sleeve assembly positioned in said venturi sleeve-receiving chamber, said venturi sleeve assembly comprising an annular venturi sleeve having a valve seat disposed adjacent said venturi ports, a venturi check valve with a frustroconical throat plug and a plug stem, a venturi check valve coil spring disposed about said plug stem for urging said throat plug in a normally closed seated position against said valve seat for blocking the flow of gasoline into said fuel conduit during said full condition and when said latch is in a closed position, said throat plug being movable to an open forward position to permit the discharge of gasoline and condensate from said condensate pickup tube into said fuel conduit during fueling and being spaced from and cooperating with said venturi sleeve to form a venturi throat communicating with said vapor passageway for return passage of gasoline vapors to said vapor return hose.

2. A vapor recovery system in accordance with claim 1 wherein said storage tanks comprise three underground storage tanks for three different grades of gasoline.

3. A vapor recovery system in accordance with claim 1 including a vapor return manifold with a pipeline extending between, communicating with and connecting said storage tanks and said vapor return line for conveying gasoline vapors to said underground tanks.

4. A vapor recovery system in accordance with claim 1 wherein said nozzle includes an attitude shutoff assembly positioned between said plug stem and said liquid sensing tube, said attitude shutoff assembly having a ball valve and passageway communicating with said liquid sensing tube, said ball valve being moveable from an open position spaced from said passageway for permitting flow of gasoline into said fuel conduit, to a closed position substantially blocking said passageway communicating with the outlet of said liquid sensing tube to simulate said full condition when said spout assembly of said nozzle is orientated in an upward attitude so as to substantially prevent the discharge of gasoline through said fuel conduit when said spouts of said nozzle are oriented in an upwardly attitude.

5. A vapor recovery system in accordance with claim 1 wherein said vapor return hose annularly surrounds and cooperates with said fuel hose to provide a coaxial hose assembly between said nozzle and said dispenser.

6. A vapor recovery system in accordance with claim 1 wherein said nozzle is operatively connected to a control valve for dispensing different grades of gasoline.

7. A vapor recovery system in accordance with claim 1 wherein each dispensing unit comprises an individual dispenser, nozzle, fuel hose, vapor return hose, and vapor pump for each grade of gasoline.

* * * * *

UNITED STATES PATENT AND TRADEMARK OFFICE
CERTIFICATE OF CORRECTION

PATENT NO.: 5,213,142

DATED: 25 May 1993

INVENTOR(S): Wolfgang H. Koch; Dennis J. Strock; Michael S. Butkovich; Harry B. Hartman It is certified that error appears in the above-identified patent and that said Letters Patent is hereby corrected as shown below:

Patent reads:

| Col. | Line | |
|---|---|---|
| 9 | 51 | **"override trip lever 182" should read --** override trip lever 182 (figure 6) adjacent --. |

Signed and Sealed this

Thirty-first Day of May, 1994

Attest:

BRUCE LEHMAN

*Attesting Officer*

*Commissioner of Patents and Trademarks*